(12) United States Patent
Simon

(10) Patent No.: US 11,489,216 B2
(45) Date of Patent: Nov. 1, 2022

(54) METHOD FOR PROVIDING A BATTERY ARRANGEMENT FOR A MOTOR VEHICLE, AND MOTOR VEHICLE

(71) Applicant: AUDI AG, Ingolstadt (DE)

(72) Inventor: Martin Simon, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 303 days.

(21) Appl. No.: 16/711,738

(22) Filed: Dec. 12, 2019

(65) Prior Publication Data

US 2020/0203789 A1 Jun. 25, 2020

(30) Foreign Application Priority Data

Dec. 20, 2018 (DE) .......................... 102018222459.5

(51) Int. Cl.
| | | |
|---|---|---|
| *H01M 10/6551* | (2014.01) | |
| *H01M 10/613* | (2014.01) | |
| *H01M 10/625* | (2014.01) | |
| *H01M 10/653* | (2014.01) | |
| *B60L 58/26* | (2019.01) | |
| *B60L 50/64* | (2019.01) | |

(52) U.S. Cl.
CPC ......... *H01M 10/6551* (2015.04); *B60L 50/64* (2019.02); *B60L 58/26* (2019.02); *H01M 10/613* (2015.04); *H01M 10/625* (2015.04); *H01M 10/653* (2015.04); *H01M 2220/20* (2013.01)

(58) Field of Classification Search
CPC ........... H01M 10/6551; H01M 10/613; H01M 10/625; H01M 10/653; H01M 2220/20; H01M 10/6556; H01M 50/20; B60L 50/64; B60L 58/26; B60L 3/0007; B60L 50/66; Y02E 60/10; Y02T 10/70
See application file for complete search history.

(56) References Cited

U.S. PATENT DOCUMENTS

| | | | | |
|---|---|---|---|---|
| 2010/0122807 A1* | 5/2010 | Harttig | ..................... | F25B 21/04 165/185 |
| 2018/0026321 A1* | 1/2018 | Rhodes | ............... | H01M 10/625 429/120 |
| 2018/0123099 A1* | 5/2018 | Fees | ..................... | H01M 50/249 |
| 2021/0047550 A1* | 2/2021 | Maurer | ................. | H01M 50/20 |
| 2021/0135313 A1* | 5/2021 | Simon | ............... | H01M 10/6567 |

FOREIGN PATENT DOCUMENTS

| | | |
|---|---|---|
| DE | 102011009987 A1 | 8/2011 |
| DE | 102010024320 A1 | 12/2011 |
| DE | 102011003535 A1 | 8/2012 |
| DE | 102011102765 A1 | 11/2012 |
| DE | 102012202841 A1 | 8/2013 |
| DE | 202013009788 U1 | 1/2014 |
| DE | 102017000266 A1 | 7/2017 |
| DE | 102016207231 A1 | 11/2017 |
| DE | 102017204412 A1 | 9/2018 |
| DE | 102017206185 A1 | 10/2018 |
| EP | 3444889 A1 | 2/2019 |
| KR | 1020180084540 A | 7/2018 |

OTHER PUBLICATIONS

German Examination Report dated Sep. 17, 2019 in corresponding German Application No. 102018222459.5; 24 pages; Machine translation attached.
Office Action dated Jan. 30, 2022, in connection with corresponding Chinese Application No. 201911317192.8 (21 pp., including machine-generated English translation).

* cited by examiner

*Primary Examiner* — Muhammad S Siddiquee

(74) *Attorney, Agent, or Firm* — Maier & Maier, PLLC

(57) ABSTRACT

A method for providing a battery arrangement for a motor vehicle, wherein a battery housing arrangement is provided, including a battery housing having at least one holding section for holding a battery module, a cooling device which provides at least part of a housing floor of the battery housing, and an underride guard which is disposed outside the battery housing at the cooling device such that a gap is created between the cooling device and the underride guard, and a viscous heat conducting element and a battery module are placed inside the holding section such that the heat conducting element is located between the underside of the battery module, which faces the cooling device, and the cooling device.

6 Claims, 2 Drawing Sheets

METHOD FOR PROVIDING A BATTERY ARRANGEMENT FOR A MOTOR VEHICLE, AND MOTOR VEHICLE

FIELD

The disclosure relates to a method for providing a battery arrangement for a motor vehicle, wherein a battery housing arrangement comprising a battery housing having at least one holding section for holding a battery module is provided, said battery housing arrangement also comprising a cooling device which provides at least part of a housing floor of the battery housing, and an underride guard which is disposed outside the battery housing on the cooling device such that a gap is provided between the cooling device and the underride guard. In addition, a viscous heat conducting element and a battery module are placed inside the holding section such that the heat conducting element is located between the underside of the battery module, which faces the cooling device, and the cooling device itself. The invention also includes a motor vehicle with a battery arrangement.

BACKGROUND

Battery housings for holding one or more battery modules, in particular for high-voltage batteries, are known from the prior art. A cooling device is usually disposed below the housing floor to be able to dissipate heat from the battery modules via the housing floor to the cooling device. It is also possible for the cooling device itself to form the housing floor of the battery housing. Since the underside of the battery modules as well as the housing floor may exhibit considerable unevenness and thus have large tolerances, when inserting the battery modules into the housing a so-called gap filler, for example a heat conducting paste, is usually used as filler material with good thermal heat conducting characteristics, to be able to dissipate the heat from the modules at a higher cooling efficiency since air gaps between the battery modules and the housing floor are thermally insulating. Typically, the gap filler is first applied to the housing floor and the modules are placed on top. The settling down of the modules causes the gap filler to be displaced so that it is distributed over the bottom of the module. This usually requires a considerably high compressive force to be applied onto the battery modules in the direction of the housing floor. The considerable flow paths and said high floor pressures can cause damage to the modules. Moreover, if no counter-measures are employed, the housing floor is deformed due to the high pressure applied. This causes the housing floor, or the cooling device, to buckle, which leads to an uneven gap width between the module floor and the housing floor, which in turn results in an uneven heat dissipation and very large gap widths overall, which inhibit heat dissipation. It would therefore be desirable to avoid such a deformation of the housing floor, or of the cooling device, when inserting the battery modules into the module housing as well as when introducing a heat conducting element of the kind described, such as the gap filler, or to keep such deformation as small as possible in the simplest and most cost-effective manner.

DE 10 2017 000 266 A1 describes a battery module holder for holding a traction battery of a motor vehicle, comprising a housing tub and a housing cover, each of which is provided in sandwich design. Each of these has an upper side and a lower side made from an organic sheet or aluminum sheet, disposed in between which is a thermoplastic foam. This is intended to improve heat insulation and increase crash safety. Fire protection fabrics may also be disposed between the battery modules and the sheets, but in this instance no viscous heat conducting elements for the thermal linking of the battery modules to a cooling device are used.

Furthermore, DE 10 2011 009 987 A1 describes an integrated aerodynamic energy storage and rear suspension arrangement. This comprises a battery support arrangement that contains a propulsion battery, which is fastened to a front sandwich panel. The front sandwich panel comprises an upper layer, for example made from steel, and a lower layer, which may also be made of steel, as well as a core with lower density, which may, for example, be provided as a foam core. This is to provide a compact support structure which is able to withstand bending loads, shear loads and torsion loads. However, this instance also does not disclose a cooling device for the battery modules as well as a thermal linking of the same via a viscous heat conducting element.

Furthermore, DE 10 2010 024 320 A1 describes a device for retaining a battery in a support structure of a vehicle chassis with a retaining device that may be fastened to the support structure. The retaining device is in this instance multi-layered. It comprises an upper layer with cooling ducts, a lower layer and an energy absorption layer between the upper and lower layers.

Said energy absorption layer is made from an elastic material or a material compound and is preferably shaped as a hollow structure. This instance again does not provide a viscous heat conducting element between the battery and the cooling device, which in this case is provided by the upper layer containing the cooling ducts.

Furthermore, DE 10 2016 207 231 A1 describes an arrangement of an electrical high-voltage energy store in a motor vehicle in which the high-voltage energy store is disposed in the area of the underbody of the motor vehicle and is covered at least partially by a floor element at the bottom, viewed in the vehicle's vertical direction, wherein at least one load distribution element is disposed in a gap provided between the high-voltage energy store and the floor element, seen in the vehicle's vertical direction, via which load distribution element the floor element may be braced against the high-voltage store. Here again, neither a cooling device nor the manner in which battery modules are linked to such a cooling device is disclosed.

SUMMARY

Thus, the above-described problems with the provision of a viscous heat conducting paste or a viscous heat conducting element between a cooling device and a battery module still remain.

It is therefore the object of the present invention to propose a method for providing a battery arrangement for a motor vehicle as well as a motor vehicle having a battery arrangement, which provides the most efficient thermal linking of a battery module to a cooling device.

Said object is met by a method for providing a battery arrangement for a motor vehicle as well as by a motor vehicle with a battery arrangement having the features according to the respective independent claims. Advantageous embodiments of the invention are the subject matter of the disclosure.

In a method according to the invention for providing a battery arrangement for a motor vehicle, a battery housing arrangement is provided, which comprises a battery housing having at least one holding section for holding a battery module, a cooling device, which provides at least part of a housing floor of the battery housing, and an underride guard, which is disposed outside the battery housing at the cooling device such that a gap is created between the cooling device and the underride guard. In addition, a viscous heat conducting element and a battery module are placed into the holding section such that the heat conducting element is located between an underside of the battery module that faces the cooling device and the cooling device. To this end, a foam-like material, which cures hard, is at least partially inserted into the gap between the cooling device and the underride guard and at least temporarily applies a supporting force onto the cooling device in the direction of the cooling device.

Such a foam-like material can advantageously provide a dual function. Due to the supporting force applied to the cooling device, which is provided by the foam-like material, which will simply be called foam from now on, a deformation of the cooling device due to the introduction of the viscous heat conducting element can advantageously be prevented or at least reduced in magnitude. Thus, said foam can advantageously provide a support means for supporting the cooling device, which permits a significantly more efficient thermal linking of battery modules via the viscous heat conducting element and the cooling device. Since a deformation of the cooling device can be reduced or fully prevented as a result, it is possible to provide significantly smaller gap widths between the cooling device and the battery module. Such smaller gap widths have a number of advantages: Firstly, a significantly reduced quantity of the viscous heat conducting element is required for thermal linking, which makes it possible to significantly reduce the overall weight of a high-voltage battery, and also provides significant cost savings since such gap fillers are usually very expensive. Furthermore, compared to metals, for example, typical viscous heat conducting elements still have a significantly lower thermal conductivity, so that by providing the smallest possible gap width, which is filled with said heat conducting element, the efficiency of heat transfer from the battery module to the cooling device can be increased significantly. Moreover, by providing even gap widths it is possible to achieve a particularly even heat dissipation across the entire module floor, or the underside of the battery module. The foam-like material, the material properties of which will be described in more detail later, can also be very easily adapted to any requirements since there are many different types of foam with varying properties, which may advantageously be chosen, depending on requirements, and introduced into the gap. This is in particular due to the fact that there is more than one way to introduce such a viscous heat conducting element between a battery module and the cooling device, which will be described in more detail later. A further great advantage of using foam is that the foam is able to adapt optimally to any kind of geometry, in this instance to the underside of the cooling device. If the underside of the cooling device is not flat, for example, due to the cooling ducts and instead has, for example, bulges, that is, it has raised and lower sections like, for example, a grooved structure, the foam is able to adapt optimally to this geometry and thus facilitate a particularly even pressure distribution onto the cooling device, which prevents the crushing of the cooling ducts or damage to the cooling device. Nevertheless, said foam not only provides a support means in a particularly advantageous manner, as described above, for supporting the cooling device, but because said foam is disposed between the cooling device and an underride guard, said foam is able to significantly increase the crash characteristics of the battery arrangement. The battery arrangement is in particular provided for placement on the underside of a motor vehicle, so that in this intended installation position of the battery arrangement the underride guard faces the ground underneath the motor vehicle. An underride guard of this kind is designed as protection from so-called bollards, that is, items or objects that impact or impinge on the battery arrangement in the direction of the vertical vehicle axis. Due to the additional foam located in the gap between the cooling device and the underride guard the impact energy from such bollards can also be absorbed, which prevents the destruction or severe deformation of the underride guard, which may also affect the battery modules. Moreover, foam can be provided in a particularly cost-effective manner, including foam with particularly low density, which reduces the weight significantly. Thus, as a result of said foam a battery arrangement can be provided with a significantly increased heat dissipation efficiency and, simultaneously, with an increased crash safety.

Generally speaking, the battery housing is not limited to a single holding section for holding a single battery module but may have multiple such holding sections for holding multiple, in particular a plurality of battery modules. One battery module comprises in this instance at least one battery cell such as, for example, a lithium-ion cell, but is preferably provided with a number of such battery cells, which are arranged in a cell pack and may, for example, be arranged in a module housing. Such multiple battery modules arranged in the battery housing can then ultimately form a high-voltage battery for the motor vehicle. The cooling device is preferably designed as a cooling plate with integrated cooling ducts through which a cooling medium or coolant may flow, in liquid or gaseous form. Moreover, the cooling device may provide the entire housing floor, or it may be arranged on the underside of a separately provided housing floor. However, the cooling efficiency is greater if the cooling device, that is, the cooling plate, itself forms the housing floor. The underride guard may, for example, also be provided as a plate, particularly a metal plate, and fastened via corresponding fastening elements to the housing floor or the cooling device, so that said plate has a certain distance to the cooling device for providing the gap between the cooling device and the underride guard.

Moreover, said heat conducting element may be provided, for example, as a heat conducting paste or as the gap filler described at the outset. Depending on the material of the heat conducting element, said element may exhibit more or less viscous properties. The heat conducting element may, for example, comprise aluminum oxide, which causes a very high viscosity of the heat conducting element. Generally speaking, any viscous material or paste may be used as the heat conducting element provided that said material has a thermal conductivity that is greater than that of air.

The gap may be filled partially or fully, or to a large extent, with a foam-like material. In the instance of a partial filling, the foam may be placed between the cooling device and the underride guard in a central area underneath the holding section for the battery module. This makes it possible to provide support for the cooling device precisely in the location where the amount of deformation during the introduction of the battery module or the heat conducting element is usually the greatest. Nevertheless, it is also possible for the foam to have a honeycomb structure, for example. Thus, generally speaking, the foam may have cavities or gaps, which is also understood to constitute a partial filling of the gap. Such a honeycomb structure or formation of the foam with gaps or cavities results in a significant weight saving. In addition or alternatively, the foam may also have recesses or slots. Such recesses in the foam are then preferably located in an area that is located closer to the cooling device than to the underride guard, or that directly adjoins the cooling device. This is because, with respect to the support effect for supporting the cooling device, the foam does not have to be particularly hard when introducing the heat conducting element, as is also described later in more detail, but even elastic properties of the foam are advantageous, whilst, on the other hand, the foam in its function as a crash element for energy absorption is preferably porous and hard.

Nevertheless, the foam may not only partially fill the gap but may, for example, fill it completely, or may even extend past the holding section, for example. The background to this is that holding sections for battery modules are usually separated from one another by corresponding webs of the battery housing. Said webs usually extend perpendicular to the housing floor. The introduction of foam into the gap below said webs has the great advantage that, when an object impacts from below onto the underride guard, this impact force can be distributed over a large area through the cured foam so that the force to be absorbed per area is overall very small, and the force can also be directed into said webs and absorbed by them, which increases the overall stability significantly.

Nevertheless, said described variations may also be combined, that is, the foam may have, for example, gaps, recesses or cavities, and this inhomogeneous foam may at the same time be distributed across the entire gap, and introduced in particular also below said webs.

In an advantageous embodiment of the invention, when introducing the viscous heat conducting element and the battery module, the battery module is first inserted into and fastened to the holding section such that the underside of the battery module has a predetermined clearance from the housing floor, and after the battery module has been inserted and fastened, the heat conducting element is injected through at least one injection opening between the underside of the battery module and the housing floor.

This has the major advantage that the introduction of the heat conducting element by injecting through an injection opening is significantly gentler than first applying the heat conducting element to the housing floor and then pressing the battery module with a high compressive force onto the heat conducting element to cause it to be evenly distributed if possible. When the heat conducting element is injected subsequently, that is, after the battery module has already been inserted into the holding section and fastened there by means of screws, for example, the forces acting on the cooling device downward on the direction of the underride guard are thus not so high, and there are also significantly smaller forces acting on the module floor, that is, onto the underside of the battery module upwards. The injection opening may, for example, be located in the floor of the battery module or anywhere in the battery housing.

There are now, advantageously, a number of possibilities as to how the deformation of the cooling device may be avoided through the foam, or at least reduced in magnitude.

In an advantageous embodiment of the invention, the foam-like material is introduced into the gap and cured prior to injecting the heat conducting element through the at least one injection opening, wherein the cured, foam-like material supports the cooling device through the supporting force during injection of the heat conducting element.

This variation has the great advantage in that, due to said support of the cooling device already whilst the heat conducting element is being injected, no deformation of the cooling device towards the underride guard, that is, no bulging or arching of the cooling device towards the underride guard, can even occur, or such deformation is present at least only temporarily and its magnitude is significantly less, which overall is significantly gentler on the cooling device, and ultimately makes particularly narrow gap widths between the cooling device and the underside of the battery module possible.

As will be described in more detail later, the foam may be very porous, for example, that is, it has no elastic components, or it may be a porous material with elastic components. If the foam is very porous, that is, if it is not elastic, it will, after curing, not permit any kind of deformation of the cooling device during injection of the heat conducting element in the direction of the underride guard. This measure is particularly effective in avoiding a deformation of the cooling device, which is particularly gentle on the cooling device itself since it is not deformed, or is deformed only to a minor degree. On the other hand it is also advantageous if the foam has elastic components, or generally exhibits elastic properties. This makes a significantly quicker injection of the heat conducting element possible for the following reason: The heat conducting element may be injected significantly faster, that is, with significantly higher pressure, into said gap between the underside of the battery module and the housing floor without the danger of causing damage to the module floor or the cooling device, for example, since, due to the elastic properties of the foam, the cooling device is able to temporarily deflect downwards, which overall reduces the pressure on the underside of the module as well as on the cooling device itself. Nevertheless, through the elastic properties of the foam a tensile force that is directed upwards, that is, from the underride guard towards the cooling device, is applied to the cooling device, which causes the viscous heat conduction element to expand evenly between the housing floor and the module floor, which in turn reduces the deformation of the cooling device, or is reversed through the tensile force of the elastic foam. In other words, under the increased injection pressure of the heat conducting element, the cooling device is temporarily deformed in the direction of the underride guard, and this deformation is reversed again through the elastic properties of the foam whilst evenly distributing the viscous heat conducting element between the module floor and the housing floor. In the end the arrangement of the cooling device is again such that said cooling device extends substantially flat, that is, parallel to the underride guard, for example. Since, as described, through said temporary deformation of the cooling device significantly higher injection pressures are possible, the injection times and thus the processing times may be reduced significantly when providing the battery arrangement. For this reason at least partially elastic properties of the foam are particularly advantageous for this method of introducing the heat conducting element.

In a further advantageous embodiment the foam-like material may, nevertheless, be introduced into the gap at a predetermined pressure that provides the support force after the heat conducting element has been injected through the at least one injection opening, so that the extent of the deformation of the housing floor in the direction of the underride guard caused by the injection of the heat conducting element is at least reduced by the supporting force. In other words, the heat conducting element is first injected between the housing floor and the module floor, and only then is the foam introduced into said gap. The deformation of the cooling device caused by injecting the heat conducting element can thus be reversed by the foam. The foam may, for example, be injected at a correspondingly high overpressure into the gap so that the cooling deformation, that is, the described deformation of the cooling device, can be reversed, causing it to take on an essentially planar geometry again. Elastic properties of the foam are in this instance not necessarily required. The foam may in this instance be provided without any elastic components, making it correspondingly inelastic and porous, which is then, for example, favorable for additional crash protection since low properties of the foam permit a large and even force distribution over the largest possible area of the force of an object impacting the underride guard, in particular in a very efficient manner. In an impact of this kind, the foam may even break up or crumble, which additionally causes energy to be absorbed or converted.

In a further advantageous embodiment of the invention, during introduction of the viscous heat conducting element and the battery module, the heat conducting element is applied first to the housing floor, and subsequent to the application of the heat conducting element the battery module is placed on the heat conducting element in the holding section under application of a compressive force onto the battery module in the direction of the housing floor. Through the support effect of the foam, also this variant of inserting the battery module advantageously facilitates a very even distribution of the heat conducting element, and a very even and narrow gap width between the housing floor and the cooling device can be achieved. This instance also provides different options for introducing the foam into the gap, that is, either before or after placing the battery module. Accordingly, a further advantageous embodiment is created when the foam-like material is introduced into the gap and cured before the compressive force is applied to the battery module in the direction of the housing floor and the supporting force is exerted by the foam-like material onto the cooling device, at least for the time in which the compressive force is being applied to the battery module in the direction of the housing floor, so that the supporting force supports the cooling device during the application of the compressive force onto the battery module. For example, the foam-like material may be introduced even before the heat conducting element is applied to the housing floor, or after the heat conducting element has been applied to the housing floor but prior to placing the battery module onto the heat conducting element, or even after the battery module has been placed onto the heat conducting element but has not yet been pressed against the heat conducting element in the direction of the cooling device. Nevertheless, the foam-like material is at least introduced into the gap and cured prior to the application of said compressive force onto the battery module in the direction of the cooling device. This facilitates the optimal support of the cooling device at least whilst pressure is applied to the battery module, which in turn reduces or fully compensates for the ultimate deformation of the cooling device in the direction of the underride guard. In this instance as well, a temporary deformation of the cooling device may be admissible as described above for the injection of the heat conducting element. The foam may in this instance also exhibit elastic properties so that initially a temporary deformation of the cooling device in the direction of the underride guard is possible, however this is reduced over time again by the tensile force of the foam whilst the heat conducting element is distributed between the underside of the battery module and the cooling device, or is distributed due to the tensile force which acts via the cooling device on the heat conducting element. The foam may also in this instance be porous, that is, it may not have any elastic properties. This example also provides for an optimal support effect of the foam for the cooling device, which will then not be deformed when setting the module.

In a further alternative, it is also possible to introduce the foam-like material into the gap at a predetermined pressure, which provides the supporting force, even after the battery module has been placed on the heat conducting element in the holding section under application of the compressive force onto the battery module in the direction of the housing floor, so that through the supporting force, the extent of deformation of the housing floor in the direction of the underride guard, caused by the compressive force, is at least reduced. The battery module may also in this instance be set, in particular by pressing it against the heat conducting element, which is distributed accordingly under deformation of the cooling device. Said deformation of the cooling device can then be reversed, at least partially, through the subsequent introduction of the foam into the gap with a corresponding amount of pressure, so that the cooling device in its end state again extends substantially flat. In this example as well, the foam may comprise an elastic component, or it may be completely inelastic.

Accordingly, a further advantageous embodiment of the invention is provided if, as foam-like material in a cured state, a porous, inelastic material is introduced into the gap. An inelastic material has particularly great advantages above all with respect to crash safety, as already described above, since it facilitates a particularly even distribution of the impact force onto a particularly large area, and a local deformation through such an impact of the cooling device, or the penetration of an object into a battery module, can be prevented in a particularly effective manner. Such a porous, inelastic material is also particularly advantageous as a support means for supporting the cooling device if such a foam is introduced subsequently, for example, that is, after the heat conducting element has been injected or distributed by an application of pressure between the underside of the module and the housing floor, in order to subsequently reverse again a deformation of the cooling device. Therefore, the supporting force that is required for reversing the deformation can be provided by the corresponding injection pressure during injection of the foam into the gap, so that this does not necessarily require any elastic properties of the foam.

On the other hand it is also possible to introduce into the gap as foam-like material a material that is also porous in the cured state with an elastic component. This is particularly advantageous if the foam is introduced into the gap before the heat conducting element is injected, or is compressed and distributed by applying pressure to the battery module. This facilitates quicker processing times because due to the elastic properties of the foam a temporary deflection or deformation of the cooling device is possible, whereby due to the elastic properties of the foam said deformation is reversed in time whilst the heat conducting element is evenly distributed between the module floor and the housing floor.

Nevertheless, said variations may also be combined. For example, the foam may consist of multiple layers. A first foam layer, for example, may be provided closer to the underride guard than to the cooling device, and a second foam layer may be provided, which is disposed closer to the cooling device than to the underride guard. In this instance the second foam layer is correspondingly more elastic than the first foam layer. Particularly preferred is that the first foam layer is inelastic, that is, it has no elastic component, but the second foam layer does. Thus, in an advantageous manner, the elastic properties and tensile forces required for supporting and resetting of the housing floor during placement of the battery modules and the heat conducting element are advantageously provided by said second foam layer, through which, as described, the processing times in the preferred variations may be significantly reduced, whilst at the same time a particularly high level of crash safety and robustness is provided by the first foam layer and its porous formation. Thus, the foam-like material may advantageously be provided as a hybrid formation which, as described, consists of two layers, one superimposed on the other, with a very brittle but stiff lower layer, for example made from polypropylene, which is optimally adapted for energy absorption in case of a crash, and a very elastic layer, made for example from polyamide, as cover layer, that is, a layer adjoining the cooling device.

However, the hardness of the foam may also be adjusted through foam geometry and its density. The foam-like material may then, for example, comprise polypropylene (PP) and/or polybutylene terephthalate (PBT). In order to provide elastic properties, in particular in the area of the cooling device, a one-sided geometric adaptation, for example by way of slots and/or cavities, may be used. To this end slots or cavities, for example, may be disposed in a layer of said foam-like material located closer to the cooling device. In an area that faces the underride guard, said foam may have no slots or cavities whatsoever, which makes it particularly hard and porous in this area facing the underride guard, and therefore optimally adapted to crash situations. In addition to the geometric adaptation through slots and/or cavities, the hardness of the foam may be modified or adapted by means of the foam grade. The foam grade influences the density of the foam. A low foam grade causes high density and thus a very hard foam after curing, whereas a higher foam grade leads to a reduced density and thus to a softer foam after curing. The elasticity depends to a large extent on the material and may be set accordingly through a suitable choice of material.

A further option is to introduce, as foam-like material, a material with a shear rate-dependent elasticity into the gap, in which case the elasticity is reduced as the shear rate increases. This is particularly advantageous since at low shear rates, as is the case when setting the module, or during introduction of the heat conducting element, a very high degree of elasticity may be provided through the foam, whereas at high shear rates, as is the case, for example, when an object impacts on the underside against the underride guard, the foam-like material is very inelastic, stiff and hard, which is particularly advantageous for crash protection.

The invention relates, moreover, to a battery arrangement, which comprises a battery housing arrangement with a battery housing having at least one holding section for holding a battery module, a cooling device which provides at least part of a housing floor of the battery housing, and an underride guard, which is disposed outside the battery housing at the cooling device such that there remains a gap between the cooling device and the underride guard. The battery arrangement, furthermore, includes a viscous heat conducting element and a battery module, which are disposed inside the holding section in such a way that the heat conducting element is located between an underside of the battery module that faces the cooling device and the cooling device. Moreover, a foam-like material is disposed at least partially in said gap.

The invention relates, furthermore, to a motor vehicle having such a battery arrangement.

The advantages described for the method according to the invention and its embodiments are equally applicable to the battery arrangement according to the invention and to the motor vehicle according to the invention.

The motor vehicle according to the invention is preferably designed as an automobile, in particular as a passenger car or truck, or as a bus or motorcycle.

Moreover, the procedural steps described in conjunction with the method according to the invention and its embodiments facilitate the further development of the battery arrangement according to the invention and of the motor vehicle according to the invention through further corresponding, objective features, which for this reason will not be described here again.

The invention also comprises the combination of the features of the described embodiments.

BRIEF DESCRIPTION OF THE DRAWINGS

The exemplary embodiments of the invention will now be described. Shown are in.

DETAILED DESCRIPTION

Figure 1:
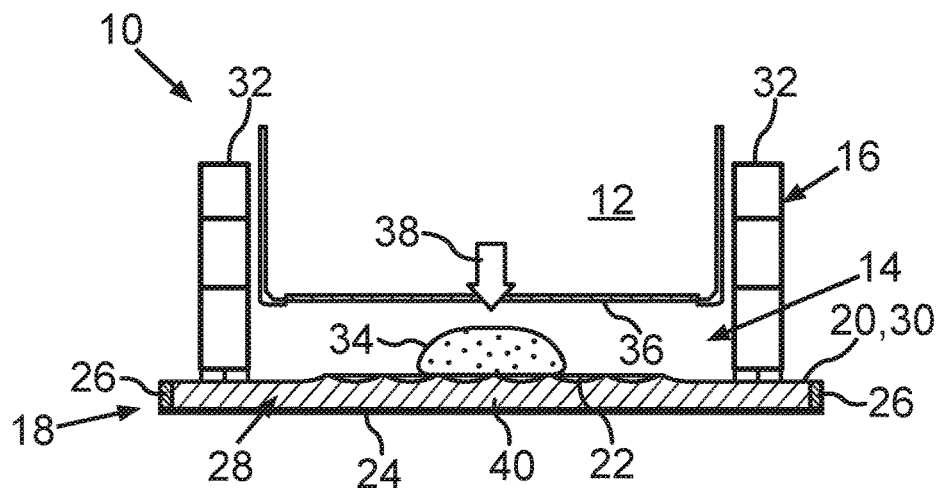
FIG. 1 a schematic representation of a battery arrangement prior to the introduction of a battery module into a holding section of the battery housing according to an exemplary embodiment of the invention.

The following described exemplary embodiments are preferred embodiments of the invention. In the exemplary embodiments, the described components of the embodiments are each to be considered as individual features of the invention, independent from each other, each of which also develops the invention further independently from each other. The disclosure therefore also includes other combinations than the represented combinations of the features of the embodiments. Moreover, the described embodiments can be complemented through further of the already described features of the invention.

The same reference numerals in the figures represent functionally equal elements.

FIG. 1 depicts a schematic representation of a battery arrangement 10 prior to the insertion of a battery module 12 into a holding section 14 of the battery housing 16 according to one exemplary embodiment of the invention. The battery arrangement 10 comprises in this instance a battery housing arrangement 18. Said battery housing arrangement 18 comprises in turn the battery housing 16 of which in this representation only a part is depicted, a cooling device 20, which in this example is designed as cooling plate with integrated cooling ducts 22, with only one of the cooling ducts 22 being marked with a reference numeral for reasons of clarity. Furthermore, the battery housing arrangement 18 also comprises an underride guard 24, which is also plate-shaped and is attached to the cooling device 20 via corresponding fastening elements 26, for example, such that the underride guard 24 extends at a certain distance from the cooling device 20. This creates a gap 28 between the cooling device 20 and the underride guard 24. The fastening elements 26 are here only depicted schematically. Said fastening elements 26 may also only be located at the outer edge region of the battery housing 16 so that, for example, the entire gap 28 between the cooling device 20 and the underride guard 24 is devoid of any separating elements, or such fastening elements 26, across all holding sections.

Furthermore, said cooling device 20 is in this example designed to form at the same time the housing floor 30 of the battery housing 16. Webs 32, in particular flange webs, extend perpendicular to the housing floor 30 or the cooling device 20, at a set distance, separating the individual holding sections 14 of the battery housing 16 from each other.

As was already mentioned, only part of the battery housing 16 is depicted here. Thus, said battery housing may be designed not only to accept a single battery module 12, but may also have a correspondingly large number of holding sections 14 that are provided for respective battery modules 12.

As is apparent from FIG. 1, battery modules 12 are inserted during battery assembly into the corresponding holding section 14 of battery housing 16. To facilitate particularly good thermal linking of the respective battery module 12 to the cooling device 20, a heat conducting element in form of a viscous heat conducting paste 34 is also provided between the underside 36 of the battery module 12, which faces the cooling device 20, and the cooling device 20.

Figure 2:
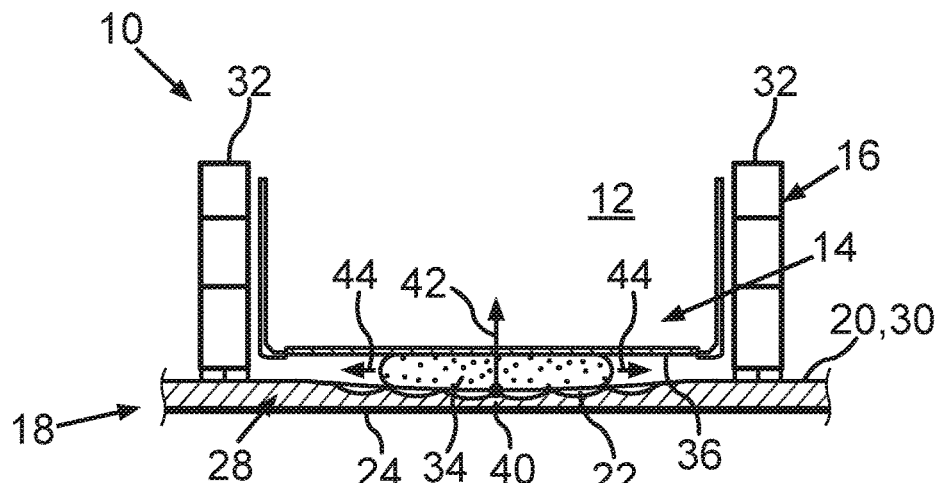
FIG. 2 a schematic representation of the battery arrangement during the introduction of the battery module into the holding section of the battery housing according to an exemplary embodiment of the invention.
Figure 3:
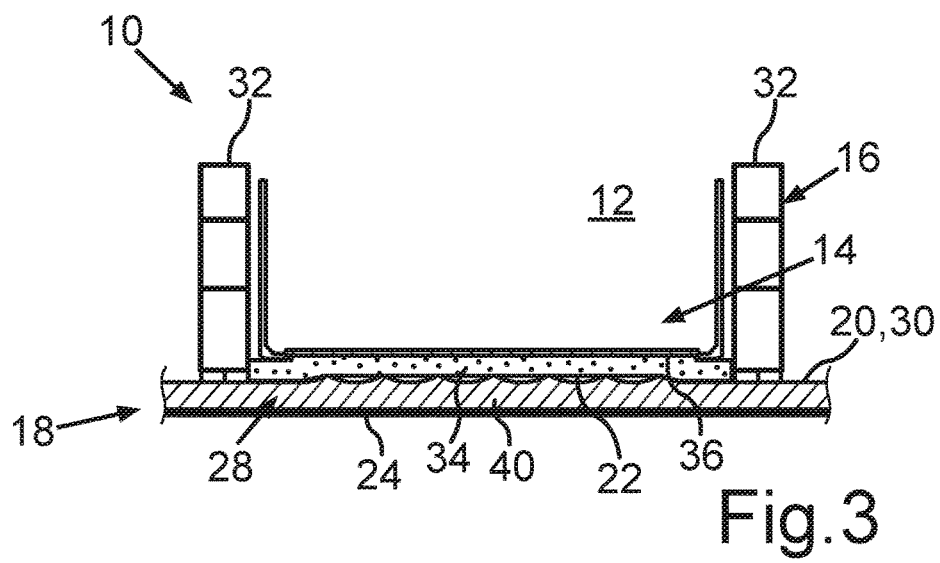
FIG. 3 a schematic representation of the battery arrangement after the introduction of the battery module into the holding section of the battery housing according to an exemplary embodiment of the invention.

FIGS. 1 to 3 depict schematically the process of introducing said heat conducting paste 34 and the setting of the battery module 12. First, the heat conducting paste 34 is applied to the housing floor 30, that is, in this instance to the cooling device 20, inside the holding section 14, as shown in FIG. 1. The heat conducting paste 34 is in this instance not applied evenly over the entire housing floor 30 inside the holding section 14 but rather locally in a central region of holding section 14. A distribution only takes place through pressing the battery module 12 onto said heat conducting paste 34. To this end a correspondingly large compressive force 38 is applied to the battery module 12 in the direction of the cooling device 20 or the housing floor 30.

Without any countermeasures, such high compressive forces 38 would normally cause a significant and permanent deformation of the cooling device 20. However, such a deformation is undesirable since it causes a relatively wide gap between the module floor 36 and the cooling device 20, which needs to be filled by the heat conducting paste 34, and, furthermore, such a gap does not usually have a constant gap width, which prevents homogenous heat dissipation. This can now advantageously be avoided in that a foam-like material, which will from now on be called foam 40, is introduced into the gap 28. In this example said foam 40 is introduced into gap 28 prior to applying the compressive force 38 from module 12 in the direction of the cooling device 20. The foam subsequently cures and, when setting the module 12, is advantageously able to exert a counterforce in form of a supporting force 42, as shown in FIG. 2, onto the cooling device 20 and thus support the cooling device 20. This makes it advantageously possible to prevent a deformation of the cooling device 20, or to significantly reduce it in magnitude, wherein a temporary deformation of the cooling device 20 may be possible depending on the properties of the foam 40, as is depicted in FIG. 2.

Different materials are possible for the foam 40, such as, for example, polypropylene (PP), polyamide (PA) and/or polybutylene terephthalate (PBT). In its cured state the foam 40 may be porous and inelastic, or it may have an elastic component. A foam 40 with elastic properties is illustrated in FIG. 2 in particular. When setting the module 12 the use of an elastic foam 40 causes a temporary deformation of the cooling device 20 in form of a bulge in the cooling device 20 in the direction of the underride guard 24 as a result of the compressive force 38 that acts upon the heat conducting paste 34 and via the heat conducting paste 34 onto the cooling device 20, as depicted in FIG. 2. Since the foam 40, due to its elastic properties, is able to yield somewhat to the compressive pressure 38, the pressures acting upon the module floor 36 and the cooling device 20 through the heat conducting paste 34 can be reduced, which is not only gentler on the battery module 12 but also on the cooling device 20, and also enables a significantly faster application of the heat conducting element or the heat conducting paste 34. In this example it is possible, for example, to press the battery module 12 significantly quicker onto the heat conducting paste 34 in the holding section 14 without the danger of damaging the battery module 12 or the cooling device 20 since the foam 40 is able to yield temporarily. Nevertheless, the supporting force 42 generated by the elastic foam 40 causes the heat conducting paste 34 to be distributed further outwards due to the pressure caused by the compressive force 42 via the cooling device 20 onto the heat conducting paste 34, which is made apparent by arrows 44 in FIG. 2, through which the deformation of the housing floor 30, or the cooling device 20 is reversed or reset in a way so that it assumes a flat end position again, as is depicted in FIG. 3.

Alternatively to the above-described method of setting the module, the battery module 12 may be inserted into the holding section 14 first and fastened there, that is, prior to introducing the heat conducting paste 34, specifically such that the underside 36 of the battery module 12 has a predetermined distance from the cooling device 20. Subsequent to that, the heat conducting paste 34 may be injected through one or more injection openings between the module floor 36 and the cooling device 20, in particular and preferably after the foam 40 has been introduced into the gap 28 and has cured. High pressures are created even during such an injection process, acting in particular also onto the cooling device 20, which can be advantageously supported by the foam 40 so that a deformation of the cooling device is avoided or is reduced in magnitude and thus does not occur at all or at least only temporarily, as shown in FIG. 2.

However, the foam 40 does not necessarily have to have elastic properties. It may also be hard and porous so that during the setting process of the battery module 12 no deformation of the cooling device 20 in the direction of the underride guard 24 is possible, as depicted in FIG. 2, or to a significantly lesser extent only. Rather, when using an inelastic foam 40, the state of the battery arrangement 10 shown in FIG. 3 would follow immediately. Nevertheless, in both instances it is possible to advantageously provide support for the cooling device 20 through the foam 40, which advantageously prevents or at least significantly reduces a final deformation of the cooling device 20 compared to the prior art.

Moreover, said foam 40 may also be subsequently introduced into the gap 28, that is, after the battery module 12 is already located in the holding section 14 in its final position and the heat conducting paste 34 is also already located between the battery module 12. The foam 40 can then, for example, be introduced at increased pressure into the gap 28, which reverses the previous deformation of the cooling device 20.

All above-described instances make it possible to achieve significantly more homogenous and smaller gap widths between the cooling device 20 and the battery module 12, whereby the heat dissipation may be increased significantly and material and costs may be saved.

The foam does not necessarily have to be present in the entire gap 28, as shown in FIGS. 1 to 3, but may also be present only in part of said gap 28. In part means, on the one hand, that the foam 40 may be provided with air or gas-filled spaces, recesses or similar, such as, for example, a honeycomb structure, which will be described later in reference to FIG. 5, or, on the other hand, that the foam 40 may only be arranged locally, for example in a central area below the holding section 14. It is, however, advantageous if the foam 40 is distributed over the entire gap 28, and extends in particular up to below the webs 32, as is shown in FIGS. 1 to 3 and in particular in FIG. 4, regardless of whether said foam 40 is provided with enclosures, recesses or similar of greater or lesser size. This has the following advantage, which will now be described in reference to FIG. 4.

Figure 4:
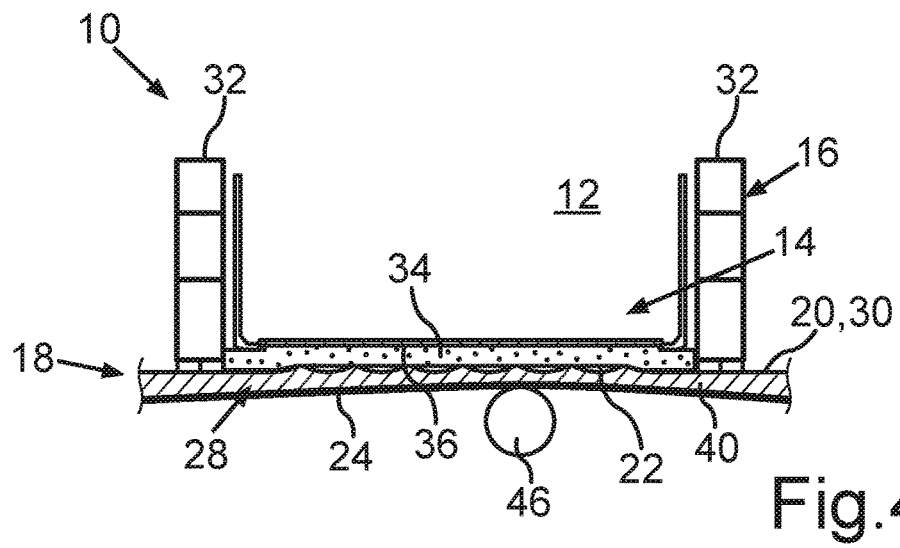
FIG. 4 a schematic representation of the battery arrangement during impact of an object onto the underride guard according to an exemplary embodiment of the invention.

The foam 40 is not only able to provide support for the cooling device when inserting the battery module 12, it is also able to advantageously increase crash safety. That is because said foam 40 is energy-absorbing when encountering a bollard barrier. Such a bollard 46, that is, an object that impacts from below onto the underride guard 24, is schematically represented in FIG. 4. In such a situation it is of advantage if the foam 40 is as inelastic as possible, for example hard and porous with only a small elastic component or no elastic component at all since the force exerted by the bollard 46 locally onto the underride guard 24 can be distributed via the hard foam 40 over a very large area. This reduces the risk that such a bollard 46 might penetrate the underride guard 24 or deform it locally to such an extent that the module 12 is damaged. The impact force can therefore be particularly efficiently distributed and absorbed by the foam 40. If the foam 40 additionally extends to below the webs 32, an additional amount of force can be absorbed via the webs 32, or the force can be transferred into the webs 32, through which the impact force can be absorbed or distributed even better.

Figure 5:
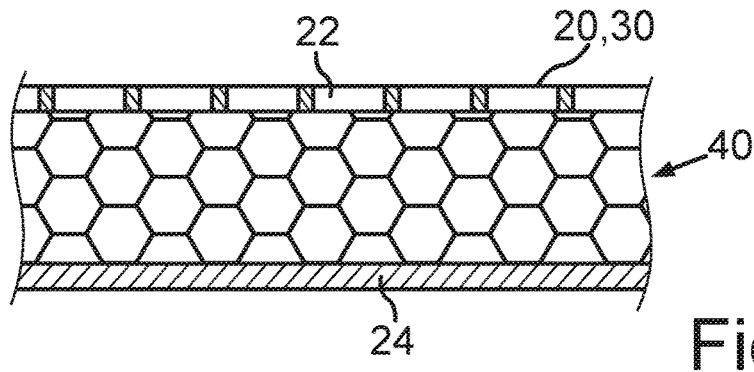
FIG. 5 a schematic representation of the foam located between the cooling device and the underride guard, said foam having a honeycomb structure according to an exemplary embodiment according to the invention.
Figure 6:
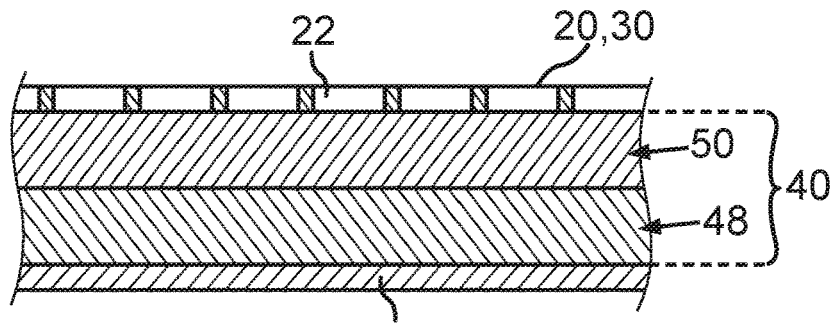
FIG. 6 a schematic representation of the foam located between the cooling device and the underride guard, said foam having a hybrid structure according to an exemplary embodiment according to the invention.
Figure 7:
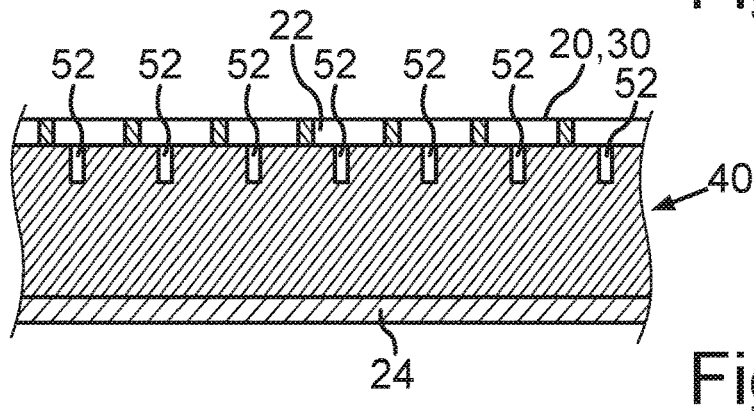
FIG. 7 a schematic representation of the foam located between the cooling device and the underride guard, said foam having slots according to an exemplary embodiment according to the invention.

Depending on requirements, it is now possible to give the foam 40 different properties, in particular making it more or less hard, or provide it with more or fewer elastic components. Different formation options are illustrated in FIGS. 5 to 7. FIGS. 5 to 7 only depict a section of the battery arrangement 10, that is, part of the cooling device 20 with the cooling ducts 22, the underride guard 24 and the foam 40 located therebetween.

Essentially, there are different materials that may be chosen for this kind of foam 40, with the elasticity properties of the final, cured foam 40 being largely determined by these materials. The hardness of the foam may also be influenced or determined by its geometry or density. In this connection, FIG. 5 depicts a schematic representation in which the foam has a honeycomb structure. Thus there may be spaces or recesses, cavities or similar in the foam 40, which reduce its hardness. Such a formation of the foam 40 may also save on weight, which is of particular advantage. However, the hardness may also be determined by the foam grade of the foam 40, wherein said foam grade also influences the density of the foam 40.

In the example shown in FIG. 6, the foam 40 is provided in multiple layers. In particular, the foam 40 comprises a first layer 48 and a second layer 50. The foam 40 is therefore provided in hybrid form. The first layer 48 here is preferably very brittle and stiff, and may comprise, for example, polypropylene. This provides for particularly high energy absorption by said first layer 48 in the event of a crash. The second layer 50 may instead be provided as an elastic layer, made for example from polyamide, which enables a particularly quick process of applying the heat conducting element or the heat conducting paste 34, or a quick setting of the modules 12.

In the example shown in FIG. 7 the foam 40 is provided with recesses in form of slots 52, which are preferably only provided in an area adjacent to the cooling device 20, which may save on weight but still provides for high energy absorption in the vicinity of the underride guard 24.

The above provides many advantageous embodiment options of the foam 40, which may be chosen or adapted depending on the application and requirements.

Overall, the examples show how, through the invention, a functionally integrated support device for the battery assembly can be provided in form of a partial or full-surface injection of a foam or foam-like material of low density into the cavity between underride guard and cooling device. This can substitute the support device during assembly and prevent deformation of the cooling device. With bollard barriers the foam has an energy-absorbing effect and is also able to transfer the locally applied force across a larger area into the cooling device, which prevents it and the modules from being damaged. The injection of the foam may advantageously take place either prior to setting the modules, in which case the cured foam acts as perfect support device, or after setting of the modules or after injecting the heat conducting paste, in which case the foam can be injected at an increased pressure and an earlier deformation of the cooling device can be reversed.

The invention claimed is:

1. A method for providing a battery arrangement for a motor vehicle comprising:

provisioning a battery housing arrangement comprising a battery housing having at least one holding section for holding a battery module, a cooling device, which provides at least part of a housing floor of the battery housing, and an underride guard, which is disposed outside the battery housing at the cooling device such that there is a gap between the cooling device and the underride guard;

introducing a heat conducting paste comprising aluminum oxide, and a battery module into the holding section such that the heat conducting paste is disposed between an underside of the battery module that faces the cooling device and the cooling device, wherein, during introduction of the heat conducting paste and the battery module, the heat conducting paste is first applied to the housing floor, and, after application of the heat conducting paste, the battery module is placed on the heat conducting paste in the holding section, and a compressive force is applied to the battery module in the direction of the housing floor; and introducing a foam-like material at least partially into the gap, wherein the foam-like material is introduced into the gap and cured prior to injection of the heat conducting paste through at least one injection opening, wherein the cured, foam-like material supports, at least temporarily, the cooling device by means of a supporting force during injection of the heat conducting paste.

2. The method according to claim 1, wherein, during introduction of the heat conducting paste and the battery module, the battery module is first placed into the holding section and fastened such that the underside of the battery module is located at a predetermined distance from the housing floor, and after the battery module has been introduced and fastened, the heat conducting paste is injected through the at least one injection opening between the underside of the battery module and the housing floor.

3. The method according to claim 1, wherein the foam-like material is introduced into the gap and cured prior to application of the compressive force onto the battery module in the direction of the housing floor, and the supporting force is exerted by the foam-like material onto the cooling device, at least while the compressive force is being applied to the battery module in the direction of the housing floor, so that the supporting force supports the cooling device during application of the compressive force onto the battery module.

4. The method according to claim 1, wherein, as foam-like material, a material that is porous and inelastic in its cured state is introduced into the gap.

5. The method according to claim 1, wherein, as foam-like material, a material that is porous in its cured state and has an elastic material component is introduced into the gap.

6. The method according to claim 1, wherein, as foam-like material, a material with shear rate-dependent elasticity is introduced into the gap, wherein the elasticity decreases as the shear rate increases.

* * * * *